(12) United States Patent
Lord et al.

(10) Patent No.: US 7,743,793 B2
(45) Date of Patent: Jun. 29, 2010

(54) HOSE CONSTRUCTION

(75) Inventors: Hubert Lord, Shefford (CA); Mario Bedard, Acton Vale (CA)

(73) Assignee: Novaflex Hose Ltd, Richmond Hill, Ontario (CA)

( * ) Notice: Subject to any disclaimer, the term of this patent is extended or adjusted under 35 U.S.C. 154(b) by 1035 days.

(21) Appl. No.: 11/392,239

(22) Filed: Mar. 29, 2006
(Under 37 CFR 1.47)

(65) Prior Publication Data
US 2007/0028983 A1    Feb. 8, 2007

Related U.S. Application Data

(60) Provisional application No. 60/666,662, filed on Mar. 30, 2005.

(51) Int. Cl.
*F16L 11/00* (2006.01)
(52) U.S. Cl. ............... 138/129; 138/130; 138/133; 138/174; 138/172
(58) Field of Classification Search ................. 138/130, 138/129, 132, 133, 174, 172
See application file for complete search history.

(56) References Cited

U.S. PATENT DOCUMENTS

| 475,384 | A | * | 5/1892 | Cockburn | 138/130 |
|---|---|---|---|---|---|
| 3,230,979 | A | * | 1/1966 | Tenreiro | 464/174 |
| 4,518,018 | A | * | 5/1985 | Kutnyak et al. | 138/130 |
| 6,053,213 | A | * | 4/2000 | Jung et al. | 138/130 |
| 6,298,884 | B1 | * | 10/2001 | Neto et al. | 138/137 |

* cited by examiner

*Primary Examiner*—Patrick F Brinson
(74) *Attorney, Agent, or Firm*—Bourque and Associates, PA

(57) ABSTRACT

The present invention provides a hose for transporting material from one destination to another and a method of constructing a hose. According to an exemplary embodiment, the hose may be constructed with two helical coils wound in opposing directions and multiple layers. The hose construction may provide a flexible hose with walls that resist kinking and rupture.

17 Claims, 3 Drawing Sheets

HOSE CONSTRUCTION

CROSS-REFERENCE TO RELATED APPLICATIONS

This application claims the benefit of U.S. Provisional Application No. 60/666,662, filed Mar. 30, 2005.

TECHNICAL FIELD

The present invention relates to a hose and method of constructing a hose, and more particularly relates to a hose and method of constructing a flexible hose.

BACKGROUND INFORMATION

Hoses are conduits that allow the transport of material from one location to another. The material may be in liquid or gas form. The material may also be solid particles that are mixed with a gas or liquid. For example, solid particles may be mixed with a liquid to produce a slurry that can be pumped through the hose. In another example, the solid particles are mixed with air. The mixture can be blown through the hose. The material, liquid, gas, or mixture enters the hose at one end, flows through the hose, and exits the hose at the material's final destination. The hose may also be used to transport energy. For example, a hydraulic braking system in a car may be used to transport brake fluid from the pump to the brake discs, thereby allowing the pump to transport energy to the brake pads.

The hose may need to be designed to prevent rupture or collapse. If a pump is located on the entrance end of the hose, the material is pushed into the hose and a positive pressure is produced on the walls of the hose as the pump pushes the material through the hose. If the pressure exerted on the wall of the hose by the material exceeds the strength of the walls, the hose will rupture and release the flow of material. If the pump is located on the exit end of the hose, the material is pulled through the hose and a negative pressure or vacuum is produced within the hose. The vacuum exerts an inward pressure on the walls of the hose. If the inward pressure exceeds the strength of the wall, the hose walls may collapse and prevent the flow of material.

To strengthen the walls of a hose, structural elements may be used in the walls of the hose. A helical coil may be used within the wall of the hose. An inner lay of material may be used on the inside of the hose to prevent contact between the coil and material transported within the hose. An outer layer may be used around the coil to protect the coil from the environment. The inner layer and outer layer may be fixed to the coil to increase the strength of the hose. The coil allows the hose to be flexible while increasing the strength of the walls of the hose.

However, many applications may still exceed the strengths of the walls of the hose. Based on the foregoing, it is apparent that there is a need for a hose and method to construct a hose that provide a flexible hose that can withstand higher positive and negative pressures.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

SUMMARY

According to one embodiment, the present invention features a hose comprising a plurality of layers including an internal layer defining an internal passageway disposed along a longitudinal axis of the hose and an external layer defining an exterior surface of the hose. The internal layer is preferably resistant to a material to be transported by the hose or reduces the friction within the passageway. Additionally, the external layer preferably includes vibration resistant material. A first and at least a second generally helical coil are wound along the longitudinal axis of the hose and are preferably selected from the group consisting of steel, plastic, or composite. The first generally helical coil is wound in a first direction and the second generally helical coil is wound in a second direction substantially opposite the first direction.

The hose optionally includes at least one reinforcing layer disposed between the internal and the external layers. In the preferred embodiment, the first generally helical coil is disposed about an internal surface of the reinforcing layer and the second generally helical coil is disposed about an external surface of the reinforcing layer. A filler layer may optionally be disposed between the first generally helical coil and the reinforcing layer and the hose may also include a second reinforcing layer disposed between the first generally helical coil and the internal layer.

Optionally, the hose may feature four generally helical coils wherein two coils are wound in the first direction and two coils are wound in the second direction. For example, the hose may feature a first and a second internal coil wound in the first and the second directions, respectively, and a first and a second external coil wound in the first and the second directions, respectively. A first filler layer may be disposed between the first and the second internal coils and a second filler layer may be disposed between the first and the second external coils. Additionally, a first reinforcement layer may be disposed between the first and the second internal coils and a second reinforcement layer may be disposed between the first and the second external coils. Alternatively, the hose may feature a first coil layer including the first two coils, a second coil layer including the second two coils, and a filler layer disposed between the first and the second coil layers.

According to another embodiment, the present invention features a hose including an interior layer having a generally continuous interior surface defining an interior passageway disposed along a longitudinal axis of the hose. An exterior layer is disposed about an exterior surface of the hose and at least one reinforcement layer is disposed between the interior layer and the exterior layer. Finally, a first and a second generally helical coil are wound about the interior layer along the longitudinal axis of the hose. The first generally helical coil is wound in a first direction and the second generally helical coil is wound in a second direction substantially opposite the first direction. The first generally helical coil is preferably disposed between interior layer and the reinforcing layer and the generally helical coil is disposed between the reinforcing layer and the exterior layer. Optionally, a filler layer is disposed between the first generally helical coil and the reinforcing layer and the hose includes at least a second reinforcing layer disposed between the first generally helical coil and the interior layer.

The hose may also feature four generally helical coils having two wound in each direction. For example, the hose may include a first and a second internal coil wound in the first and the second directions, respectively, and a first and a second external coil wound in the first and the second directions, respectively. Alternatively, the hose may include a first coil layer including the first two coils wound in the same direction and a second coil layer including the second two coils both wound in the opposite direction from the first coil layer.

According to yet another embodiment, the present invention features a hose including a first layer having a generally continuous interior surface defining an interior passageway disposed along a longitudinal axis of the hose. A first reinforcement layer is disposed about an exterior surface of the first layer and a first generally helical coil is wound about the exterior surface of the first layer in a first direction along the longitudinal axis of the hose. The first generally helical coil is disposed between the first layer and the first reinforcement layer. An exterior layer is disposed about an exterior surface of the first reinforcement layer and a second generally helical coil is wound about the exterior surface of the first reinforcement layer along the longitudinal axis of the hose in a second direction substantially opposite the first direction. The second generally helical coil is disposed between the reinforcement layer and the exterior layer.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

The present invention provides a hose for transporting material from one destination to another. The hose may be used in a wide variety of applications. For example, the hose may be used to transport petroleum products or other hazardous chemicals. In other exemplary uses the hose may be used to transport granular solids, for example, sugar, sand, or cement. The hose may be used in industrial applications requiring a negative pressure relative to the external environment, thus creating a vacuum within the hose. The hose may also be used in industrial applications requiring a positive pressure relative to the external environment causing an outward force to be exerted on the walls of the hose.

Figure 1:
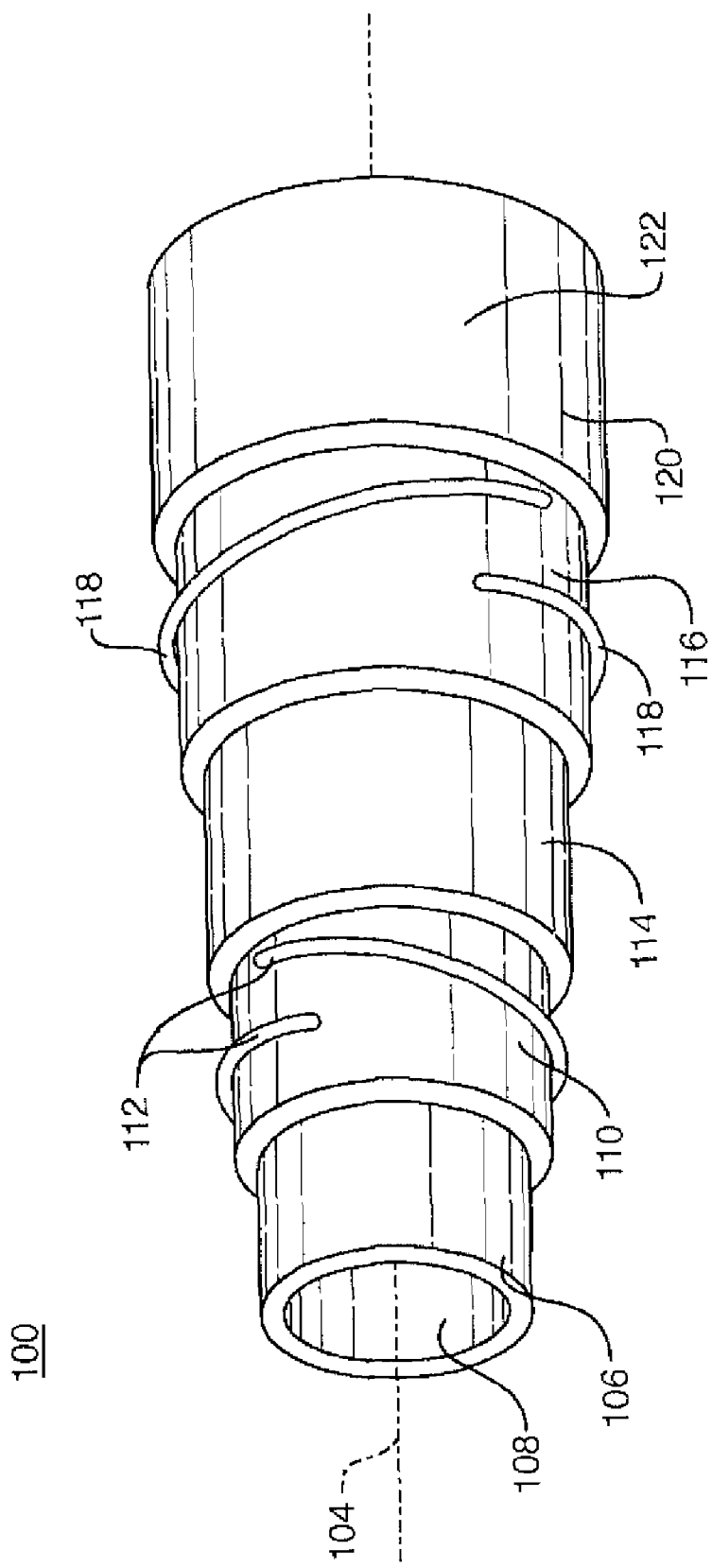
FIG. 1 is a perspective view of one embodiment of a hose having two coils according to the present invention.

A first exemplary embodiment 100 of the present invention may feature a hose 102 constructed with two helical coils wound in opposing directions. The first exemplary embodiment 100 of the hose 102 is presented in FIG. 1. A section of the hose 102 is displayed running horizontally across the figure along the longitudinal axis 104. The various exemplary layers of the hose 102 have been removed for illustrative purposes. The combined layers of the hose produce the walls of the hose 102.

An interior layer 106 of the hose provides a surface 108 that contacts the material transported within the hose 102. In one exemplary embodiment, the interior layer 106 is made of a rubber tube. The material used to construct the interior layer 106 of the hose 102 may be determined based on the material that the hose 102 is intended to transport. For example, if the hose 102 is designed to transport a petroleum product, the material used to construct the interior layer 106 may need to be a material that does not degrade in the presence of petroleum. The intended application for the hose may also determine the required interior layer 106 material of the hose. The intended application of the hose 102 may require that the interior layer 106 has a specified smoothness or hardness. For example, to reduce the amount of pressure required to transport the material, the surface of the interior layer 106 may need to be a specific smoothness to reduce friction. In another example, the material may be abrasive to the interior layer 106 and may require that the interior layer 106 is made of a material that can provide a specified hardness. Based on the application of the hose 102, the interior layer 106 may be constructed of a variety of materials to provide the desired characteristics for the application of the hose 102. The methods used to construct the interior layer 106 may use a variety of techniques known in the art, for example, extrusion, molding, or coating techniques. The interior layer 106 may also be treated to provide an interior surface 108 with the desired characteristics.

An interior reinforcement layer 110 may be used to provide strength to the walls of the hose 102. The interior reinforcement layer 110 may be made of a material such as, but not limited to, metal, polyester, nylon cord, high strength fibers or composites (for example, but not limited to, Kevlar®, Spectra® or the like). The interior reinforcement layer 110 may be made by weaving the cord to produce a sleeve that surrounds the interior layer 106. The interior reinforcement layer 110 may be constructed using other known techniques. The thickness of the cord and thickness of the interior reinforcement layer 110 may be designed to provide the desired strength required for the intended application of the hose 102. The interior reinforcement layer 110 may be designed to provide strength to the wall of the hose 102 in both a longitudinal direction and radial direction. For example, the interior reinforcement layer 110 may provide strength in a radial direction in an application that requires either a negative or a positive pressure on the walls of the hose 102. By increasing the thickness of the interior reinforcement layer 110, the hose 102 may be designed to handle increased pressure. The interior reinforcement layer 110 may also provide strength to the hose 102 in a longitudinal direction. In applications that require lengthwise tension on the hose 102, the thickness of the cords or density of the interior reinforcement layer 110 may be increased to provide additional longitudinal strength to the hose 102. The interior reinforcement layer 110 may be bonded to the interior layer 106 using adhesive or another bonding process.

A first helical coil 112 is preferably wound around the interior reinforcement layer 110. The first helical coil 112 may be made of steel, rigid plastic, or composite material (for example, but not limited to, Kevlar®, Spectra® or the like). The first helical coil 112 may be used to prevent kinking of the hose 102 and provide strength to the walls of the hose 102. The first helical coil 112 may allow the hose 102 to be flexible and bend while preventing the hose 102 from bending to the point of kinking. Kinking of the hose 102 may prevent the transport of material through the hose 102 and may cause increased wear of the hose 102. The first helical coil 112 may be produced by winding the coil around the interior reinforcement layer 110. The first helical coil 112 may be wound in either a clockwise or counter-clockwise fashion. The first helical coil 112 may be bonded to the interior reinforcement layer 110 using adhesive or another bounding process.

A filler layer 114 may be added to the hose 102. The filler layer 114 may be used to provide adequate space between the various layers of the hose 102 for strength purposes. The filler layer 114 may also provide additional rupture protection and prevent various layers from wearing against other layers. The filler layer 114 may also be used to allow interior layers to expand in a radial direction. The filler layer 114 may be made of rubber, plastic, or composite material. The methods used to construct the filler layer 114 may use a variety of techniques known in the art, for example, extrusion, molding, or coating techniques.

An exterior reinforcement layer 116 may be used to provide strength to the walls of the hose 102. The exterior reinforcement layer 116 may be made of similar material and use similar construction methods as the interior reinforcement layer 110, as previously described. The thickness of the cord and thickness of the exterior reinforcement layer 116 may be designed to provide the desired strength required for the intended application of the hose 102, as previously described with regard to the interior reinforcement layer 110. The exterior reinforcement layer 116 may be woven in a direction opposite the weave direction of the interior reinforcement layer 110. For example, if the interior reinforcement layer 110 is woven in a clockwise direction, the exterior reinforcement layer 116 may be woven in a counter-clockwise direction. The exterior reinforcement layer 116 may be bonded to the filler layer 114 or use adhesive or another bounding process.

A second helical coil 118 may be wound around the exterior reinforcement layer 116. The second helical coil 118 may be made of steel, rigid plastic, or composite material. The second helical coil 118 may be used to provide additional protection against kinking of the hose 102 and provide additional strength to the walls of the hose 102. The second helical coil 118 may be produced by winding the coil around the exterior reinforcement layer 116 in a direction opposite the first helical coil 112. For example, if the first helical coil 112 is wound in a clockwise direction the second helical coil 118 may be wound in a counter-clockwise direction. The combination of the fist helical coil 112 and the second helical coil 118 provides additional strength to the hose 102. The second helical coil 118 may be bonded to the exterior reinforcement layer 116 using adhesive or another bonding process.

An exterior layer 120 of the hose 102 provides an exterior surface 122 that contacts the exterior environment of the hose 102. In one exemplary embodiment the exterior layer 120 is made of a rubber tube. The intended exterior environment of the hose 102 may determine the material used to construct the exterior layer 120 of the hose 102. The methods used to construct the exterior layer 120 may use a variety of techniques known in the art, for example, extrusion, molding, or coating techniques. The exterior layer 120 may also be treated to provide an exterior surface 122 with the desired characteristics.

The invention is not limited to the construction as disclosed in the first exemplary embodiment 100. The various layers used to construct the hose 102 as disclosed in the first exemplary embodiment 100 may be omitted or additional layers may be added and are within the scope of the invention. For example, depending on the application, the hose 102 may be constructed without the interior reinforcement layer 110 or exterior reinforcement layer 116. In another example the hose 102 may be constructed without the filler layer 114.

Figure 2:
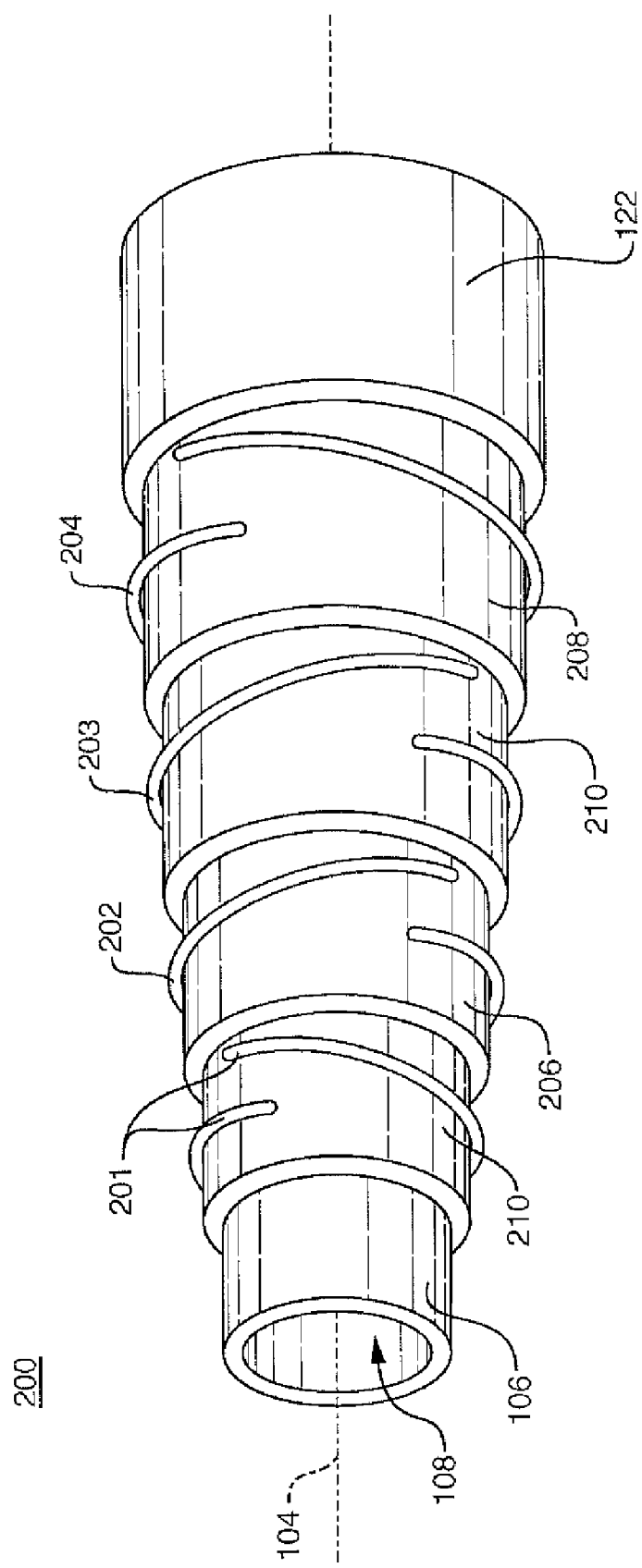
FIG. 2 is a perspective view of one embodiment of a hose having four coils according to the present invention.

In addition to omitting layers of the hose 102, additional layers may be used to provide additional strength or other characteristics for the hose 102. For example, the hose 200, FIG. 2, may be constructed using four helical coils 201, 202, 203, 204. In this example, a first interior helical coil 201 may be wound clockwise and a second interior helical coil 202 may be wound counter-clockwise. A filler or reinforcement layer 206 may be constructed between the first interior helical coil 201 and the second interior helical coil 202. A first exterior helical coil 203 may be wound clockwise and a second exterior helical coil 204 may be wound counter-clockwise. A filler or reinforcement layer 208 may be constructed between the first exterior helical coil 203 and the second exterior coil 204. Additionally, the hose 200 may include any of the other layers described above such as, but not limited to, additional reinforcement or filler layers 210 disposed before, between, and after the interior coils or exterior coils. The additional coils may be used to provide additional strength while still allowing the hose 200 to be flexible.

Figure 3:
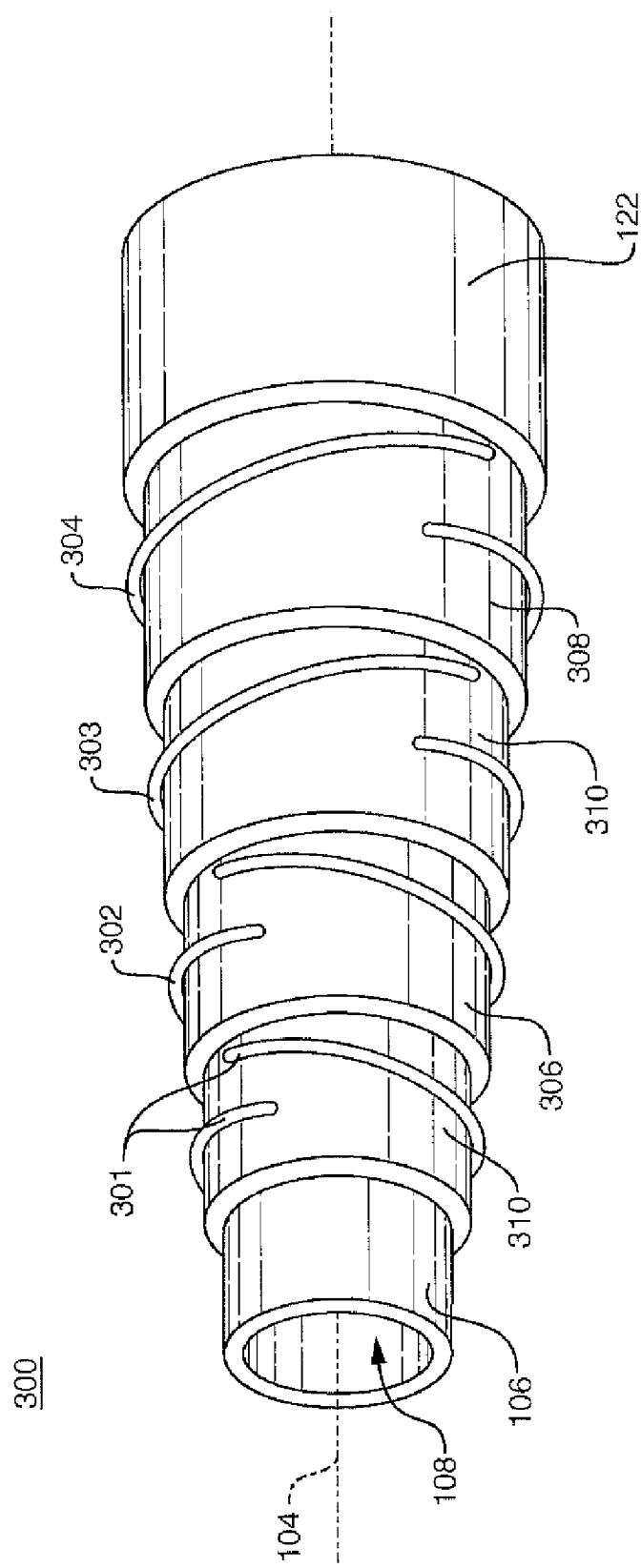
FIG. 3 is a perspective view of another embodiment of a hose having four coils according to the present invention.

In another exemplary hose 300, FIG. 3, having four coils 301, 302, 303, 304, the first interior helical coil 301 and the second interior helical coil 302 may both be wound clockwise in a parallel manner providing one layer of two coils. The first exterior helical coil 303 and second exterior helical coil 304 may both be wound counter-clockwise in a parallel manner providing a second layer of two coils. The first layer of coils 301, 302 may be separated by a filler layer or reinforcement layer 306 and the second layer of coils 303, 304 may be separated by a filler layer or reinforcement layer 308. Additionally, the hose 300 may include any of the other layers described above such as, but not limited to, additional reinforcement or filler layers 310 disposed before, between, and after the interior coils or exterior coils. The additional coils may be used to provide additional strength while still allowing the hose 300 to be flexible.

As mentioned above, the present invention is not intended to be limited to a system or method which must satisfy one or more of any stated or implied object or feature of the invention and should not be limited to the preferred, exemplary, or primary embodiment(s) described herein. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the claims when interpreted in accordance with breadth to which they are fairly, legally and equitably entitled.

The invention claimed is:

1. A hose comprising:
   a plurality of layers including an internal layer defining an internal passageway disposed along a longitudinal axis of said hose and an external layer defining an exterior surface of said hose;
   a first and at least a second generally helical coil wound along said longitudinal axis of said hose, wherein said first generally helical coil is wound in a first direction and said second generally helical coil is wound in a second direction substantially opposite said first direction;

at least one reinforcing layer disposed between said internal and said external layers, wherein said first generally helical coil is disposed about an internal surface of said at least one reinforcing layer and said at least a second generally helical coil is disposed about an external surface of said at least one reinforcing layer; and a filler layer disposed between said first generally helical coil and said at least one reinforcing layer.

2. The hose as claimed in claim 1 wherein said internal layer is resistant to a material to be transported by said hose.

3. The hose as claimed in claim 1 wherein said internal layer includes a material that reduces the friction along said passageway.

4. The hose as claimed in claim 1 wherein said external layer includes vibration resistant material.

5. The hose as claimed in claim 1 wherein said first and said at least a second generally helical coil is selected from the group consisting of steel, plastic, or composite.

6. The hose as claimed in claim 1 further including at least a second reinforcing layer disposed between said first generally helical coil and said internal layer.

7. A hose comprising:

a plurality of layers including an internal layer defining an internal passageway disposed along a longitudinal axis of said hose and an external layer defining an exterior surface of said hose;

at least four generally helical coils including a first and a second internal coils and a first and a second external coils, wherein two of said at least four coils are wound in a first direction and two of said at least four coils are wound in a second direction along said longitudinal axis of said hose, wherein said first and a second internal coils are wound in said first and said second directions, respectively, and said first and a second external coils are wound in said first and said second directions, respectively.

8. The hose as claimed in claim 7 further includes a first filler layer disposed between said first and said second internal coils and a second filler layer disposed between said first and said second external coils.

9. The hose as claimed in claim 7 further includes a first reinforcement layer disposed between said first and said second internal coils and a second reinforcement layer disposed between said first and said second external coils.

10. The hose as claimed in claim 7 further including at least one reinforcement layer and at least one filler layer disposed between said internal and said external layers.

11. The hose as claimed in claim 7 including a first coil layer including said first two coils, a second coil layer including said second two coils, and a filler layer disposed between said first and said second coil layers.

12. The hose as claimed in claim 7 including a first coil layer including said first two coils, a second coil layer including said second two coils, and a reinforcing layer disposed between said first and said second coil layers.

13. A hose comprising:

an interior layer having a generally continuous interior surface defining an interior passageway disposed along a longitudinal axis of said hose;

an exterior layer disposed about an exterior surface of said hose;

at least one reinforcement layer disposed between said interior layer and said exterior layer;

a first generally helical coil wound about said interior layer along said longitudinal axis of said hose and disposed between said interior layer and said at least one reinforcing layer, wherein said first generally helical coil is wound in a first direction;

a second generally helical coil wound about said interior layer along said longitudinal axis of said hose and disposed between said at least one reinforcing layer and said exterior layer, wherein said second generally helical coil is wound in a second direction substantially opposite said first direction; and a filler layer disposed between said first generally helical coil and said at least one reinforcing layer.

14. The hose as claimed in claim 13 further including at least a second reinforcing layer disposed between said first generally helical coil and said interior layer.

15. The hose as claimed in claim 1 further including four generally helical coils, wherein a first two coils are wound in said first direction and a second two coils are wound in said second direction.

16. The hose as claimed in claim 15 further including a first and a second internal coil wound in said first and said second directions, respectively, and a first and a second external coil wound in said first and said second directions, respectively.

17. The hose as claimed in claim 15 including a first coil layer including said first two coils and a second coil layer including said second two coils.

* * * * *